Dec. 13, 1960     E. BRICHARD     2,963,820
GLASS DRAWING APPARATUS
Filed Feb. 4, 1958
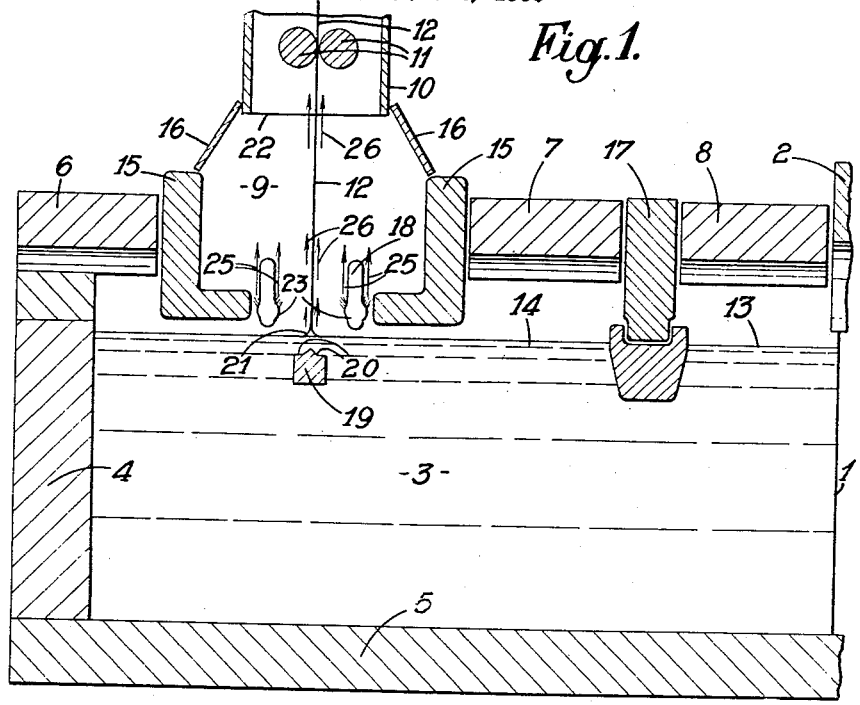
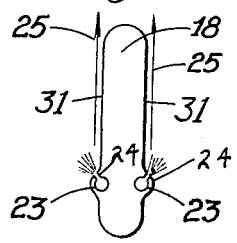
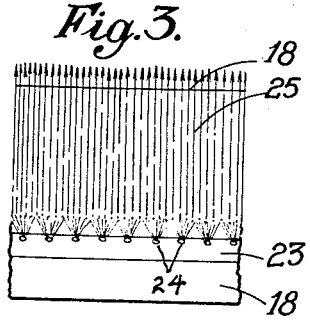
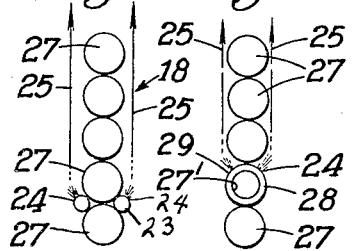
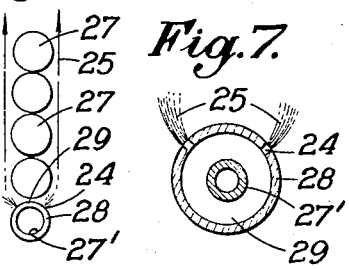
INVENTOR
EDGARD BRICHARD
By Corey, Hart & Hempel
ATTORNEYS United States Patent Office 2,963,820
Patented Dec. 13, 1960

2,963,820

GLASS DRAWING APPARATUS

Edgard Brichard, Jumet, Belgium, assignor to Union des Verreries Mecaniques Belges Societe Anonyme, Charleroi, Belgium, a Belgian company Filed Feb. 4, 1958, Ser. No. 713,127

Claims priority, application Great Britain Feb. 19, 1957

8 Claims. (Cl. 49—17)

This invention relates to the manufacture of sheet glass by vertical drawing from the surface of a bath of molten glass and has for an object the production of drawn sheet glass having generally improved physical characteristics.

In the various well known methods of manufacturing sheet glass by vertical drawing, the glass is drawn upwardly from a bath of molten glass in a drawing chamber, the glass sheet emerging from the meniscus formed at the surface of the molten glass. In order to accelerate the setting of the sheet immediately above the meniscus, the vertically drawn sheet of glass is passed between coolers disposed in spaced relation with each face of the sheet. The coolers are usually in the form of water boxes of rectangular shape and are positioned a short distance above the surface of the molten glass in approximate parallelism to the glass sheet. The coolers accomplish their function by causing the glass sheet to cool by radiation to the coolers. Accordingly, the coolers are disposed in effective relation to the glass sheet to assure the desired cooling by radiation.

In accordance with some of the known methods, the drawn sheet continues upwardly from the drawing chamber into a vertical tower or lehr, at the top of which the rising sheet is cut to appropriate size. In other methods, the drawn sheet is bent over a bending roll located in the drawing chamber and is then advanced through a horizontal lehr, the sheet being cut to appropriate size on its emergence from the horizontal lehr. The well known methods of vertically drawing sheet glass are the "Fourcault" process, in which the sheet is drawn from glass forced through a slot in the floor of a debiteuse under a hydrostatic head, and the "Pittsburgh" or "Colburn" processes, in which the sheet is drawn directly from the surface of the molten glass. The "Pittsburgh" process differs from the "Colburn" process in the respect that the former employs a draw bar which is submerged in the bath of molten glass below the line of draw, to stabilize the position of the meniscus.

It has been found that in order to make distortion-free sheet glass by vertical drawing, it is necessary to avoid local temperature differences in the glass in the region where the glass sheet is being formed. The distortion which occurs in a glass sheet that has been subjected to such local temperature differences is in the nature of waves running longitudinally of the rising sheet. Objects viewed through a sheet of glass having such waves are distorted and particularly so when the objects are viewed through the glass at a sharp angle to the waves.

Many devices have been proposed to the art and are known for assuring the delivery of molten glass of a predetermined thermal homogeneity to the bath surface about the line of draw, but occurrences in the drawing chamber itself have militated against the complete success of such proposals and devices. Generally speaking, one main reason for the lack of continuous thermal homogeneity at the surface of the molten glass to each side of the line of draw, is the tendency for irregular convection currents of relatively cold air or other ambient gases to be set up within the drawing chamber through contact of such gases with the coolers located in such chamber. The thus cooled gases have a tendency to flow downwardly from the coolers towards the meniscus and onto the plastic glass rising from the meniscus. As the cooled gases are reheated by direct contact with the molten glass in the vicinity of the meniscus they are caused to rise along the sides of the glass sheet because of the natural chimney effect existing in the drawing chamber in the vicinity of the glass sheet. The impingement of the cooled gases on the plastic glass rising from the meniscus disturbs the regular rate of cooling which is required across the width of the sheet in order to obtain a distortion-free glass sheet. As a result the glass sheet will have variations in thickness due to the aforesaid wave distortions running parallel to the drawing direction. The nearer the coolers are positioned to the glass sheet being drawn, the greater is the danger to the glass sheet from the downwardly flowing currents of cooled gases.

In an endeavor to prevent the aforesaid downward flow of the convection currents of cooled air or other gases from the coolers to the surface of the molten bath, it has been proposed to provide a source of heat below the coolers so as to re-direct the currents of cooled gases upwardly into the normal upward flow of gases over the surfaces of the glass sheet resulting from the chimney effect existing in the drawing chamber. It will be appreciated, however, that such re-direction of the currents of cooled gases may result in the re-directed gases coming into contact with the glass sheet at a place spaced above the meniscus. Although the thermal shock to the glass in the sheet from such impact of the cooled gases is not as great as it would have been had the cold gases reached the glass in the vicinity of the meniscus, yet there is unavoidably produced at the area of impact a variation in the rate of cooling across the sheet.

It has also been proposed to prevent the formation of cooled gases about the coolers and thus eliminate the possibility of the formation of convection currents that flow downwardly from the coolers onto the molten glass by directing an upwardly blast of air alongside each face of the cooler. It was found however, that such forcible air currents tend seriously to disturb the normal convection flow in the drawing chamber by producing uncontrolled reflected cold air streams in the vicinity of the sheet. This condition engenders irregular rates of cooling, impairs any improvement in uniformity of thickness, and sets up stresses in the sheet which becomes dangerous, especially when the sheet is being cut.

It is the primary object of the present invention to prevent the downward flow of currents of cooled gases from the coolers to the surface of the molten glass, or the traveling of such cooled gases to the meniscus, without disturbing the normal convection flow in the drawing chamber or producing harmful effects in the glass being drawn. It is contemplated that this purpose shall be accomplished under a condition of maximum transparency to radiation between the glass sheet and the coolers so as to maintain the desired rate of cooling of the glass in and immediately above the meniscus, and thereby attain the desired rate of cooling to assure the intended thickness and uniformity of thickness for the sheet.

In accordance with the aforesaid object, the present invention comprehends apparatus for vertically drawing glass in sheet form from a body of molten glass in which there are included cooling means, preferably water cooled, located on both sides of the drawn sheet to initiate setting of the sheet above the meniscus by radiation of heat from the glass to the coolers, and gas burners adapted to create by means of gas flames a continuous supply of hot gases which by their buoyancy rise in contiguity with the surfaces of the coolers and which are in the form of curtains or layers that are effectively continuous in the direction of the length of the coolers and, between the coolers and the glass, are transparent to radiation from the glass. In operating apparatus constructed in accordance with the invention, the gas burners associated wtih each cooler are preferably so operated as to cause only a moderate upward flow or drift of the combustion gases, the layers thereof formed by such gas burners effectively continuously covering the surfaces of the cooler so as to entirely eliminate the possibility of convection currents of cooled gases being set up by contact of ambient gases with the cooler and flowing downwardly to the surface of the molten glass or traveling to the meniscus. The gas burners may be carried on the coolers in such manner that there is effected a heat exchange relation between the burners and their associated coolers.

In order that a clearer understanding of the invention may be had, reference is now made to the preferred embodiments of the invention illustrated diagrammatically and by way of example in the accompanying drawings, in which like numerals are employed to indicate the same or similar parts throughout and in which Fig. 1 is a vertical section longitudinally of the extension of a glass melting tank and of the lower part of the superstructure including a drawing chamber and the lower portion of a vertical lehr through which the glass is vertically drawn, the drawing chamber having disposed therein coolers constructed in accordance with the present invention;

Fig. 2 is an end view of one of the coolers shown in Fig. 1 on an enlarged scale to show its construction more clearly;

Fig. 3 is a fragmentary side elevational view of the cooler shown in Figs. 1 and 2 and on which is indicated by arrows the continuous nature of the layer of hot gases in the direction of the length of the cooler and the direction of flow of such gases;

Fig. 4 is an end view of a modified form of cooler embodying the invention;

Fig. 5 is a view similar to Fig. 4 showing another form of cooler made in accordance with the invention, the burner in this embodiment being incorporated in the tube construction of the cooler;

Fig. 6 is a view similar to Fig. 5, but showing the burner-carrying tube located at the bottom of the cooler; and Fig. 7 is a vertical sectional view on an enlarged scale of the burner-carrying tube embodied in the coolers shown in Figs. 5 and 6.

In the drawing tank installation shown in Fig. 1 of the drawings, the end of the glass melting tank is indicated by the numeral 1 and the roof thereof by the numeral 2. The tank is provided with an extension 3 which is closed at its outer end by an end wall 4 and which is constructed on a hearth extension 5. Superimposed over the extension 3 are the usual front element 6, curtain element 7, and rear roof element 8. Located between the front and curtain elements is the drawing chamber 9 which at its upper end opens into a vertical lehr 10. As is customary, the lehr is provided with vertically spaced pairs of traction rollers, one pair only of which is illustrated and identified by the reference numeral 11. As is indicated in Fig. 1, the function of the rollers is to draw the glass sheet 12 up from the surface 13 of the body of molten glass 14 in the extension 3, the glass sheet emerging from the meniscus 21 which is formed on the line of draw. The glass sheet 12 is drawn up through the drawing chamber, the walls of which comprise the usual L blocks 15 and the inclined walls 16 connecting the tops of the L blocks with the lehr. In the drawing chamber 9 are disposed coolers 18 arranged in the normal manner between the L blocks 15 and the sheet 12, but constructed in accordance with the invention in a manner which will be hereinafter more fully explained. Between the curtain and rear roof elements 7 and 8, respectively, is disposed the usual tweel 17 for preventing flue gases from the melting tank 1 passing into the extension 3 and reaching the surface of the glass from which the sheet 12 is drawn. To maintain the position of the line of draw, that is to say, the line generation of the sheet 12, and to assist in regulating the viscosity of the glass reaching the sheet, there is submerged in the molten glass 14 a refractory bar 19 is usually referred to as a draw-bar. As indicated in Fig. 1 of the drawings, the upper face of the draw-bar may comprise two contiguous concave faces 20 which meet immediately below the line of draw. It will be understood that the draw bar, instead of being a solid refractory bar, may in known manner be slotted medially of its length.

It will be understood from the foregoing that in the operation of apparatus shown in Figure 1, the sheet 12 is drawn from the surface 13 of the molten glass 14 up into and through the drawing chamber 9 and through the mouth 22 thereof into the lehr 10 in which the glass sheet is annealed. When the sheet emerges from the top of the lehr it is cut to appropriate size in the known manner. As the sheet 12 enters the drawing chamber, it passes between the coolers 18 which accelerate the setting of the sheet immediately above the meniscus 21 by causing heat to pass by radiation from this region of the sheet to such coolers.

In accordance with the present invention, the coolers 18 are each provided adjacent to its bottom with longitudinally extending burners 23 into which combustible gases are fed at a suitable pressure. Each burner 23 is formed with a plurality of burner jets 24 adapted to create an upward flow of hot gases contiguous to and along the lateral faces 31, in Figs. 2 and 3, of the opposite sides of the coolers. The jets 24 of each burner are further arranged with relation to each other so that their flames produce a curtain or layer of hot gases which is effectively continuous in the direction of the length of the burner and, therefore of the cooler with which such burner is associated, as is indicated by the arrows 25 in Fig. 3 of the drawings. The relation of the jets 24 in each burner may be such and the flames therefrom so adjusted that the flames in the row just touch or are slightly spaced apart so long as they provide a continuous upward flow or drift of hot gases, continuous in the direction of the length of the cooler. Preferably two burners 23 are provided adjacent the bottom of each cooler 18, one burner on each side of the cooler. Thus both lateral faces 31 of the sides of a cooler 18, upwardly from the bottom end thereof, are effectively curtained or covered by continuous layers of upwardly flowing hot gases. These layers of hot gases effectively prevent the formation of a cold boundary layer on the exterior surfaces of the cooler. As a consequence, the cooler cannot cause the creation of convection currents of cooler gases tending to flow downwardly toward the surface 13 of the molten glass. Since the hot gases are produced by combustion, only a relatively small volume of hot gases is required to prevent the formation of cold boundary layers on the coolers. The curtaining layers of hot gases, therefore, may be controlled in a known manner so as to obtain maximum transparency to radiation between the sheet 12 and the coolers 18 and thereby to maintain the desired rate of cooling of the glass in and immediately above the meniscus. Since the volume of hot gases produced is relatively small, the volume of air utilized from the drawing chamber to support the combustion of the combustible gas at the burners is not sufficient to materially affect the normal chimney effect of upward flow of hot gases along the sides of the glass sheet, as is indicated by the arrows 26 in Fig. 1, as the latter moves upwardly in the drawing chamber between such glass sheet and the layers of hot gases in direct contact with those lateral faces 31 of the coolers 18 that are in opposed relation to the sides of the glass sheet.

In the construction shown in Figs. 1 to 3 of the drawings, the coolers 18 are of the water-box type and the burners 23 are integrally connected, as by welding, to the casings thereof. By thus associating the burners 23 in heat exchange relation with the coolers, the former are protected against distortion by excessive heat. The burner jets 24 of this embodiment are in the nature of spaced holes through which the combustible gas to be burned can escape. The flow of the combustible gas through the burner jets is such that the desired upward drift of hot gases caused by the flames at the jets, is produced substantially entirely by the buoyancy of such hot gases. By predetermining the relation of the burner jets on the burners 23 and to the coolers 18, the direction of the flames and the desired upward drift of hot gases can be precisely determined.

Instead of using the water-box type of cooler illustrated in Figs. 1 to 3, a tube type of cooler having a serpentine form or composed of parallel tubes connected by headers at each end, as is well understood in the art, may be employed. In the diagrammatic Figs. 4 to 6 there are shown several types of tubular coolers in which burners are incorporated in accordance with the invention so that the flames produced thereby on each side of the cooler will engender the desired upward drift of hot gases to prevent the formation of a cold boundary layer on the cooler. In all of these constructions, the burners are protected by the coolers against distortion by excessive heat.

In the construction shown in Fig. 4, the cooler is composed of a vertical bank of five runs of tubes 27, which may be continuous or individually connected to end headers as already explained. Located in the spaces formed between the two lower tubes 27 on both sides of the cooler, and seated against such tubes, are burners 23 which may be welded to the tubes they engage or secured in contact therewith by fittings carried on headers. By placing the burners 23 between the two lower runs of the cooler in this manner, the burners are not only cooled by both runs, but are to a great extent shielded by the lower run from the heat radiated from the surface of the molten glass. The burner jets 24 of the burners 23 in the construction shown in Fig. 4, are arranged so that the flames issuing therefrom are divergent from the vertical plane as is illustrated. The lambent nature of the flames, however, causes them immediately to turn upwardly under the influence of the natural convection flow in the drawing chamber, thus forming on each side of the coolers the desired layers of hot gases which by their buoyancy rise in contiguity with the surfaces of the coolers, the flow of the hot gases being indicated by the arrows 25.

In the tube type of cooler shown in Fig. 5, the burner jets 24 are provided in a tubing 28 which is arranged in spaced concentric relation about a water tube 27' of smaller diameter than the other water tubes 27 in the cooler. Fig. 7 shows more clearly this concentrically arranged burner tube and water tube construction. The annular space 29 between the tubes 28, 27' forms a gas conduit for supplying the combustible gas to the burner jets 24 formed in the tube 28. The burner jets 24 are formed by two rows of openings in the upper part of tube 28, each row of openings being arranged in a predetermined manner on each side of the cooler so that the flames produced at such openings form the required upwardly drifting layers of hot gas on each side of the coolers to prevent the formation of a cold boundary layer. In this embodiment as well as in the embodiment of Fig. 4, the bottom tube 27 is sufficiently near the molten glass to prevent the formation about that tube of a cold boundary layer. But in any case, the upwardly drifting gases on each side of the coolers tend to entrain any gases that might tend to form layers about the bottom tube 27. The possibility of a boundary layer forming about the bottom tube of the cooler can be entirely eliminated by positioning the concentrically arranged burner tube 28 and water tube 27' construction at the bottom of the cooler, as shown in Fig. 6 of the drawings.

It is believed to be apparent from the foregoing description of the drawings that cooling means constructed in accordance with the present invention effectively prevents the formation of convection currents of cold air about the coolers. Hence conditions are engendered by the means of this invention for obtaining thermal homogeneity at the surface of the molten glass. Although the construction shown in Fig. 1 of the drawings, illustrates the method of drawing in which a draw-bar is submerged below the line of draw in the body of molten glass, it will be understood that the present invention is not restricted to this exemplification and contemplates the employment of coolers such as herein described in association with constructions employing other methods for drawing the sheet vertically, such as when drawing is effected by using a debiteuse instead of a draw-bar, as in the "Fourcault" process, or when neither a draw-bar nor a debiteuse is employed, as in the "Colburn" process. Other modifications can obviously be made in the arrangements described without departing from the spirit of the invention or the scope of the appended claims.

I claim:

1. Apparatus for vertically drawing glass in sheet form from a body of molten glass comprising a drawing chamber, cooling means located in said drawing chamber above said body on both sides of the glass sheet being drawn therefrom to initiate setting of the sheet adjacent and above the meniscus by radiation of heat from the glass to said cooling means, the cooling means on each side of the glass sheet having one lateral face thereof disposed in opposed relation to such side of the sheet and being spaced from the sheet a sufficient distance to permit normal upward convection flow of gases over such side of the glass sheet, and means disposed adjacent the bottom of each cooling means for delivering an upward flow of hot gases rising in direct contact with and covering both laeral faces of each such cooling means above such delivering means to prevent the formation thereby of downwardly flowing streams of cooled gases, said hot gas delivering means being constructed and arranged to produce such hot gases so that they form over both of the lateral faces of the cooling means on each side of the glass sheet continuous rising layers of such gases which do not substantially disturb the normal convection flow in the drawing chamber and which between such cooling means and the glass sheet are separated from the latter by said normal upward convection flow of gases.

2. Apparatus for vertically drawing glass in sheet form from a body of molten glass comprising a drawing chamber, cooling means located in said drawing chamber above said body on both sides of the glass sheet being drawn therefrom to initiate setting of the sheet adjacent and above the meniscus by radiation of heat from the glass to said cooling means, the cooling means on each side of the glass sheet having one lateral face thereof disposed in opposed relation to such side of the sheet and being spaced from the sheet a sufficient distance to permit normal upward convection flow of gases over such side of the glass sheet, and gas burners disposed adjacent the bottom of each cooling means to produce hot gases which by their buoyancy drift upwardly in direct contact with and cover both lateral faces of each such cooling means above said gas burners to prevent the formation thereby of downwardly flowing streams of cooled gases, said gas burners being arranged to produce such hot gases so that they form over both of the lateral faces of the cooling means on each side of the glass sheet continuous rising layers of such gases which do not substantially disturb the normal convection flow in the drawing chamber and which between each such cooling means and the glass sheet are separated from the latter by said normal upward convection flow of gases.

3. Apparatus for vertically drawing glass in sheet form from a body of molten glass comprising a drawing chamber, cooling units located in said drawing chamber above said body on both sides of the glass sheet being drawn therefrom to initiate setting of the sheet adjacent and above the meiscus by radiation of heat from the glass to said cooling units, each cooling unit having one lateral face thereof disposed in opposed relation to a side of the glass sheet and spaced from the latter a sufficient distance to permit normal upward convection flow of gases over such side of the sheet, and each of said cooling units including two series of gas burners disposed adjacent the bottom of such unit and arranged to produce hot gases which by their buoyancy drift upwardly in direct contact with and cover both lateral faces of such unit above said gas burners to prevent the formation thereby of downwardly flowing streams of cooled gases, the burners in said two series of gas burners being spaced to produce such hot gases so that they form over both of the lateral faces of each unit continuous rising layers of such gases which do not substantially disturb the normal convection flow in the drawing chamber and which between each said unit and the glass sheet are separated from the latter by said normal upward convection flow of gases.

4. Apparatus for vertically drawing glass as defined in claim 3, in which said two series of gas burners of each cooling unit are mounted on said unit so as to be in heat exchange relation therewith and so as to be protected by the cooling effect of said cooling means against the heat of said molten glass body in said drawing chamber.

5. Apparatus for vertically drawing glass as defined in claim 3, in which said two series of gas burners of each cooling unit comprise elongated gas supply tubes mounted on both sides of said cooling unit so as to extend in the direction of the length of the latter, and a series of spaced burner jets provided on each of said tubes in predetermined relation to each other and to said cooling unit.

6. Apparatus for vertically drawing glass as defined in claim 3, in which said two series of gas burners of each cooling unit are mounted on said unit so that the bottom of the latter shields said gas burners from the heat radiated from the surface of the molten glass in said drawing chamber.

7. Apparatus for vertically drawing glass as defined in claim 3, in which said gas burners in each cooling unit comprise an outer hollow tube extending in the direction of the length of said cooling unit and an inner hollow tube arranged in spaced concentric relation within said outer tube, said tubes forming therebetween an annularly-shaped passageway for combustible gas and said inner tube forming a passageway for cooling fluid, and two rows of spaced burner jets opening laterally from said outer hollow tube, each of said rows of jets extending along a side of said cooler unit to provide the continuous covering layer of gases for the lateral face of such unit side.

8. Apparatus for vertically drawing glass is defined in claim 7, in which said concentrically arranged tubes are at the bottom of said cooling unit.

References Cited in the file of this patent

UNITED STATES PATENTS

| 2,125,914 | Haight | Aug. 9, 1938 |
| 2,158,669 | Amsler | May 16, 1939 |
| 2,632,503 | Bailey | Mar. 24, 1953 |

FOREIGN PATENTS

| 525,898 | Great Britain | Sept. 6, 1940 |
| 873,603 | Germany | Apr. 16, 1953 |